Oct. 14, 1924.

W. T. DOYLE 1,511,446

PROCESS FOR MAKING FINISH COAT PUTTY

Filed Oct. 16, 1923     5 Sheets-Sheet 1

INVENTOR.
William T. Doyle
BY
Henry T. Williams,
ATTORNEY.

Oct. 14, 1924.
W. T. DOYLE
1,511,446
PROCESS FOR MAKING FINISH COAT PUTTY
Filed Oct. 16, 1923  5 Sheets-Sheet 2
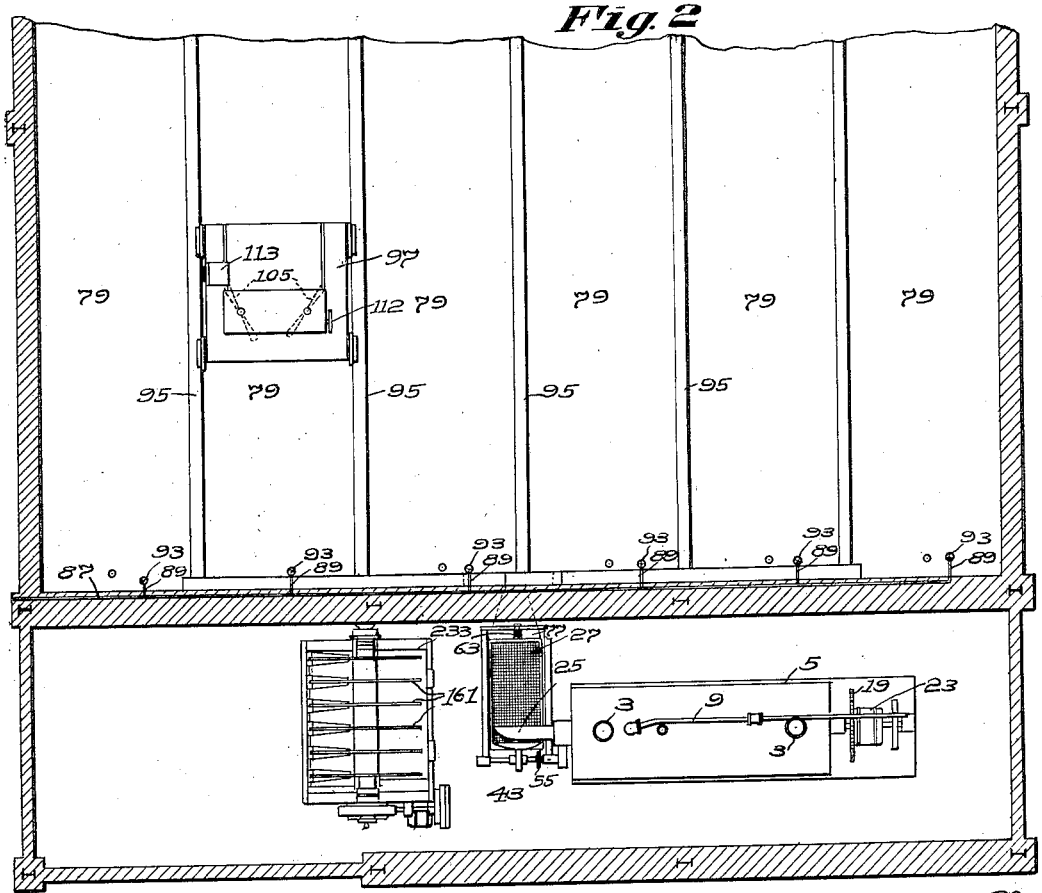
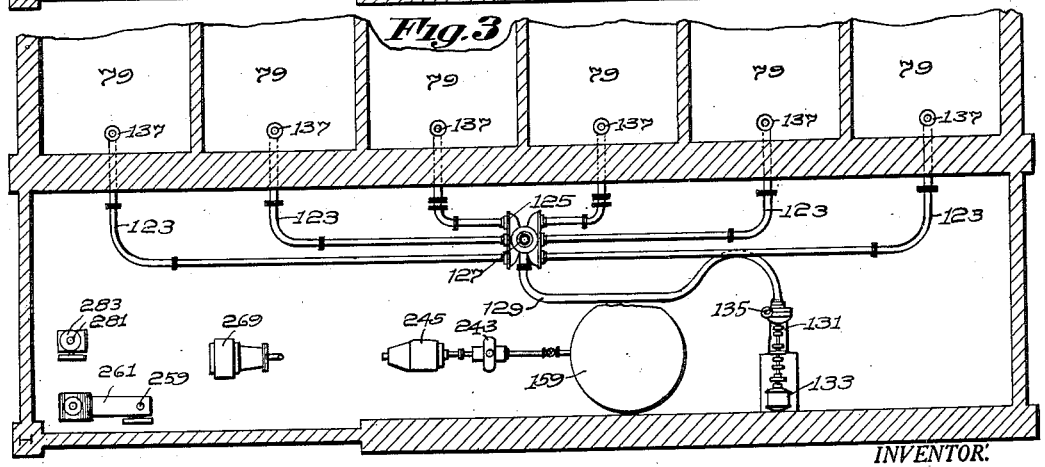
INVENTOR.
William T. Doyle
BY
Henry T. Williams,
ATTORNEY.

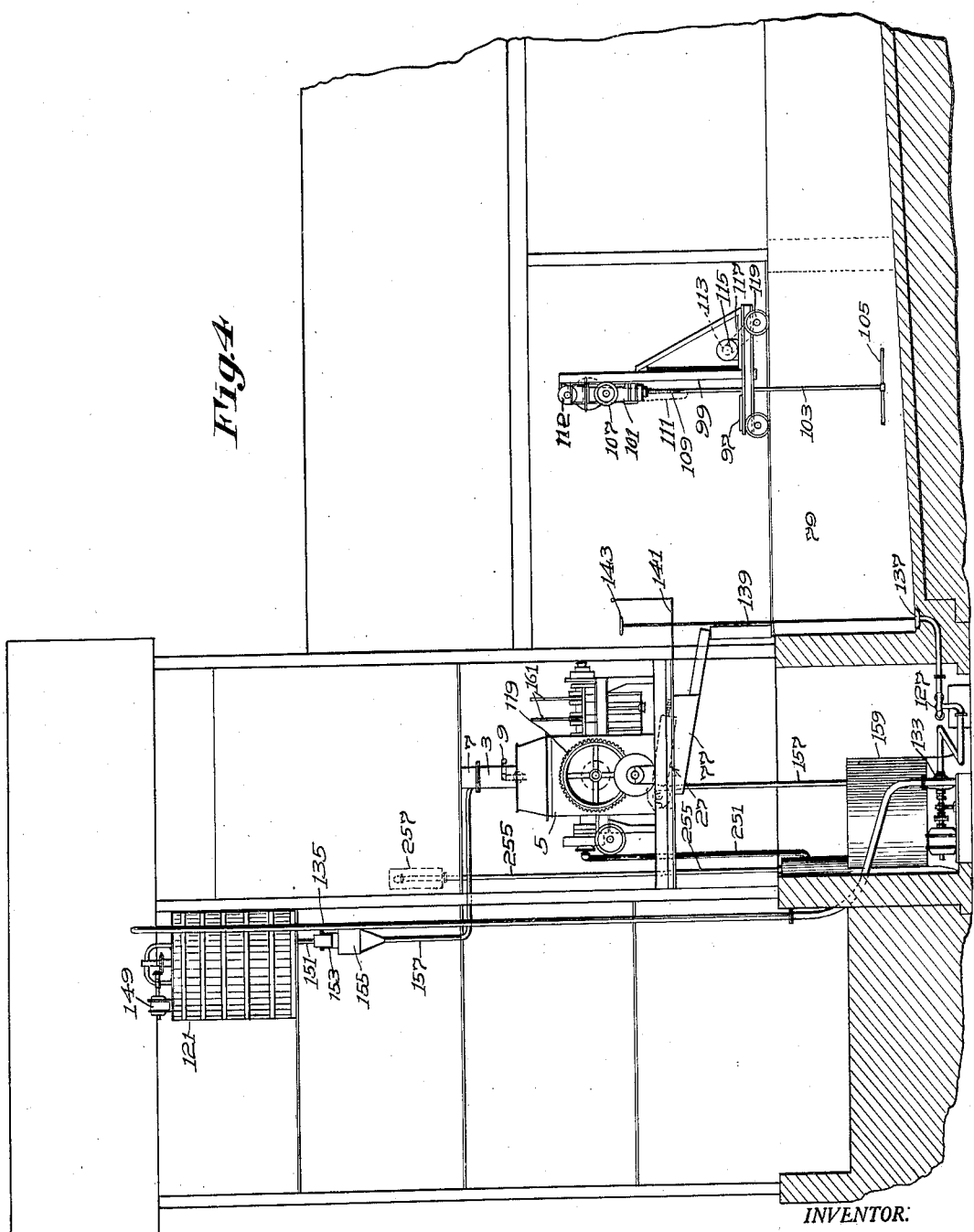

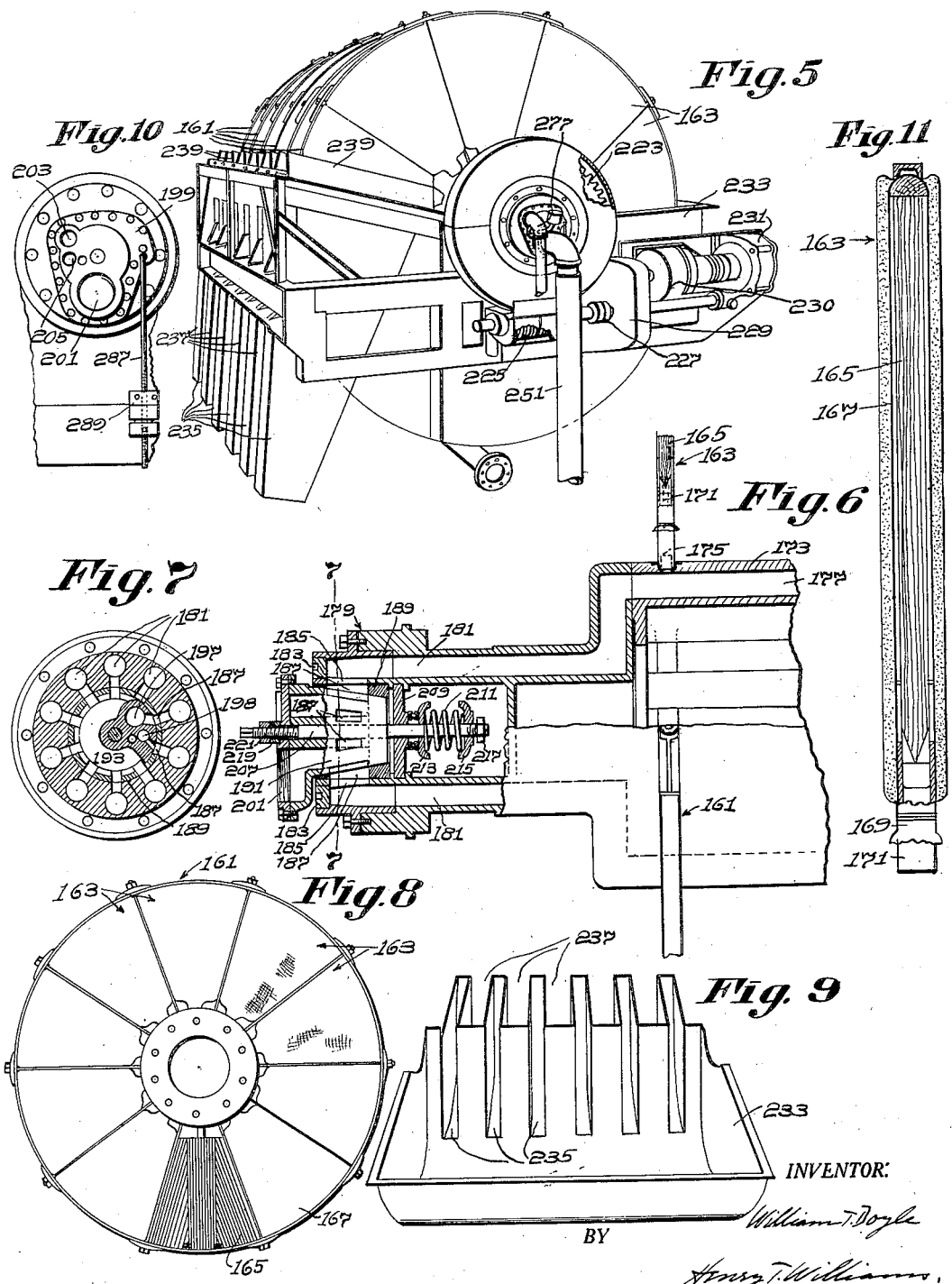

Oct. 14, 1924.
W. T. DOYLE
1,511,446
PROCESS FOR MAKING FINISH COAT PUTTY
Filed Oct. 16, 1923      5 Sheets-Sheet 5
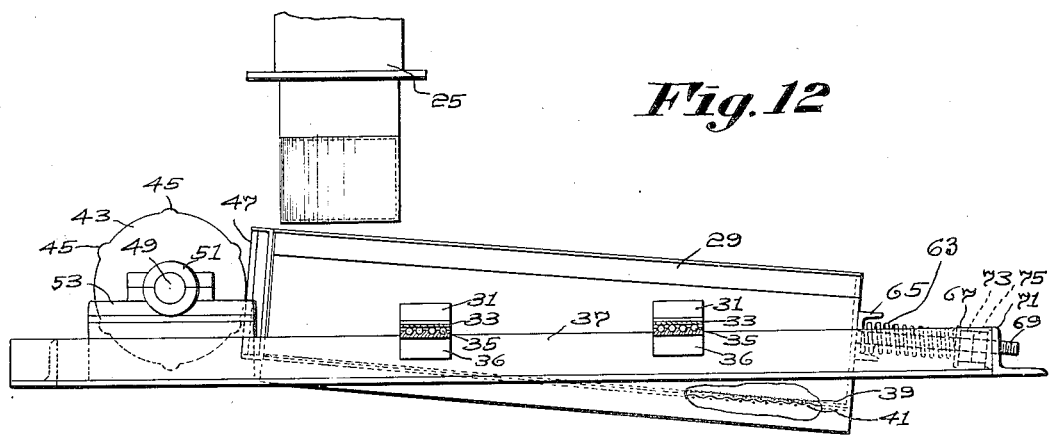
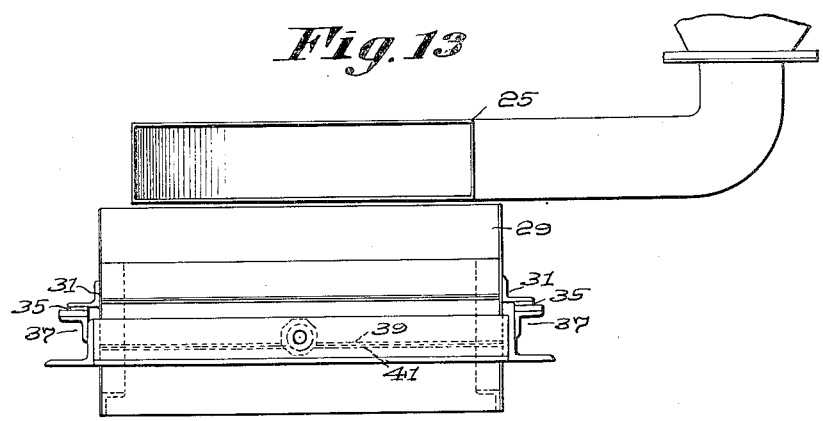
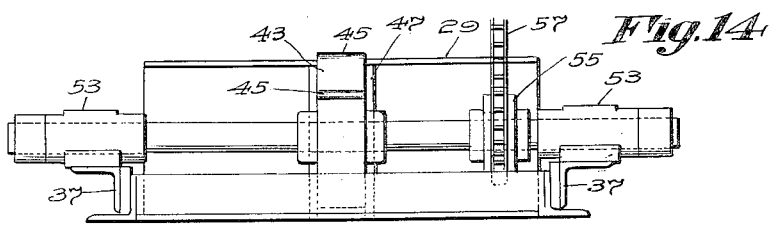
INVENTOR:
William T. Doyle
BY Henry T. Williams.
ATTORNEY.

Patented Oct. 14, 1924.

1,511,446

UNITED STATES PATENT OFFICE.

WILLIAM T. DOYLE, OF BOSTON, MASSACHUSETTS, ASSIGNOR TO STURTEVANT MILL COMPANY, OF BOSTON, MASSACHUSETTS, A CORPORATION OF MASSACHUSETTS.

PROCESS FOR MAKING FINISH-COAT PUTTY.

Application filed October 16, 1923. Serial No. 668,956.

*To all whom it may concern:*

Be it known that I, WILLIAM T. DOYLE, a citizen of the United States, residing at Boston, in the county of Suffolk and State of Massachusetts, have invented certain new and useful Improvements in Processes for Making Finish-Coat Putty, of which the following is a specification.

The invention to be hereinafter described relates to a process for making finish coat lime putty. This is known in the art as the base to which are added water and plaster of Paris or fine sand in making the surface or finish coat material applied to plastered interior walls and other surfaces.

Finish coat lime putty has been manufactured by a wet process in which a certain amount of lime and water were introduced into a vat and mixed to slake the lime. The lime solution was then introduced to a fixed fine screen, but only a small percentage of this solution would pass through the fine screen, due to the sticky character of the solution. The purpose was to remove all but very fine particles of unburned or unslaked lime. Then this screened material was conducted to vats made of pine or other porous wood. The vats were covered to prevent circulation of air over the same and to prevent sunlight from entering therein. The material was allowed to remain in these vats a sufficient length of time, usually three or four days, to permit aging of the material. Thereupon, the material had dried sufficiently to be in the form of a paste which would not flow readily and was in condition for transportation to the job or field of use, and ready to have water and plaster of Paris or fine sand added thereto to produce the finish coat material.

This was a practicable process in some climates, but was not in cold, damp climates, for the reason that several weeks were required for the slaked lime solution to dry in the vats sufficiently to have the proper condition for use.

If three or four weeks were required for the proper drying of the material, it would be necessary to provide the plant with a sufficient number of aging vats to take care of production to satisfy the demand of each day. A large area of the plant would need to be devoted to these vats. Some method of heating would have to be provided to prevent the material from freezing in cold weather. And the material would need to be excavated or dug out from the vats by hand labor. These conditions would require a large investment of capital, and would render manufacture of the product expensive.

The aim and purpose of the present invention, therefore, is to provide a process whereby a high grade finish coat lime putty can be manufactured on a large scale in a short space of time with economy in plant area and equipment, and with economy in labor.

In carrying the invention into practical effect, the lime and water are mixed in a vat to slake the lime as before, but the lime solution on leaving the slaker is passed through a specially constructed screen of fine mesh and having provision for bumping or shaking the screen, so that nearly all of the lime solution can be screened and available for manufacture of finish coat putty, whereas, as stated, by the former process only a small percentage of the lime solution coming from the slaker was available for this purpose. Since nearly all of the lime solution passes through the screen, the relatively large, slow slaking portions of the lime are removed, and the amount of time required to insure complete slaking of the lime is materially shortened. It is important that all of the lime shall be slaked, since if unslaked particles are present, there is danger of cracking or popping of the finish coat when applied to a wall.

On leaving the screen the lime solution is passed into the aging vats, and preferably allowed to remain therein a sufficient period to assure slaking of substantially all of the lime. Excess water in the solution may be allowed to remain in the solution until all danger of presence of free, unslaked lime therein is past. From that point it is merely necessary to remove sufficient water from the lime solution to give the same the consistency and plasticity essential for use.

Heretofore the solution has been allowed to stand in the aging vats until enough water is removed by evaporation so that the material will not flow and can be placed in hods or containers without flowing out of the same, but in damp climates this evaporation requires several weeks.

However, by the present invention the excess water is quickly eliminated. In the present instance of the invention, this is accomplished mechanically, and desirably by means of a filter machine which may be a vacuum filter machine of either the disk or drum type.

In order that the aged lime putty may be readily transferred from the vats to the filter machine, water may be added thereto and the mixture may be thoroughly whipped, stirred or agitated, thereby to render the same in fluid condition.

The process may be practiced by the apparatus shown in the accompanying drawings, wherein:

Fig. 2 is a plan of a portion of the apparatus including the aging vats, a slaker, the screen and the filter machine;

Fig. 3 is a horizontal section through portions of the vats, showing a plan of the pump, piping and valve arrangement for controlling the delivery of the lime solution from the vats;

Fig. 4 is a vertical transverse section through a portion of the apparatus, showing in side elevation the slaker, the screen, the agitator, and the system of piping for conducting the lime solution from the vats to the tank which delivers the solution to the filter;

Figure 1:
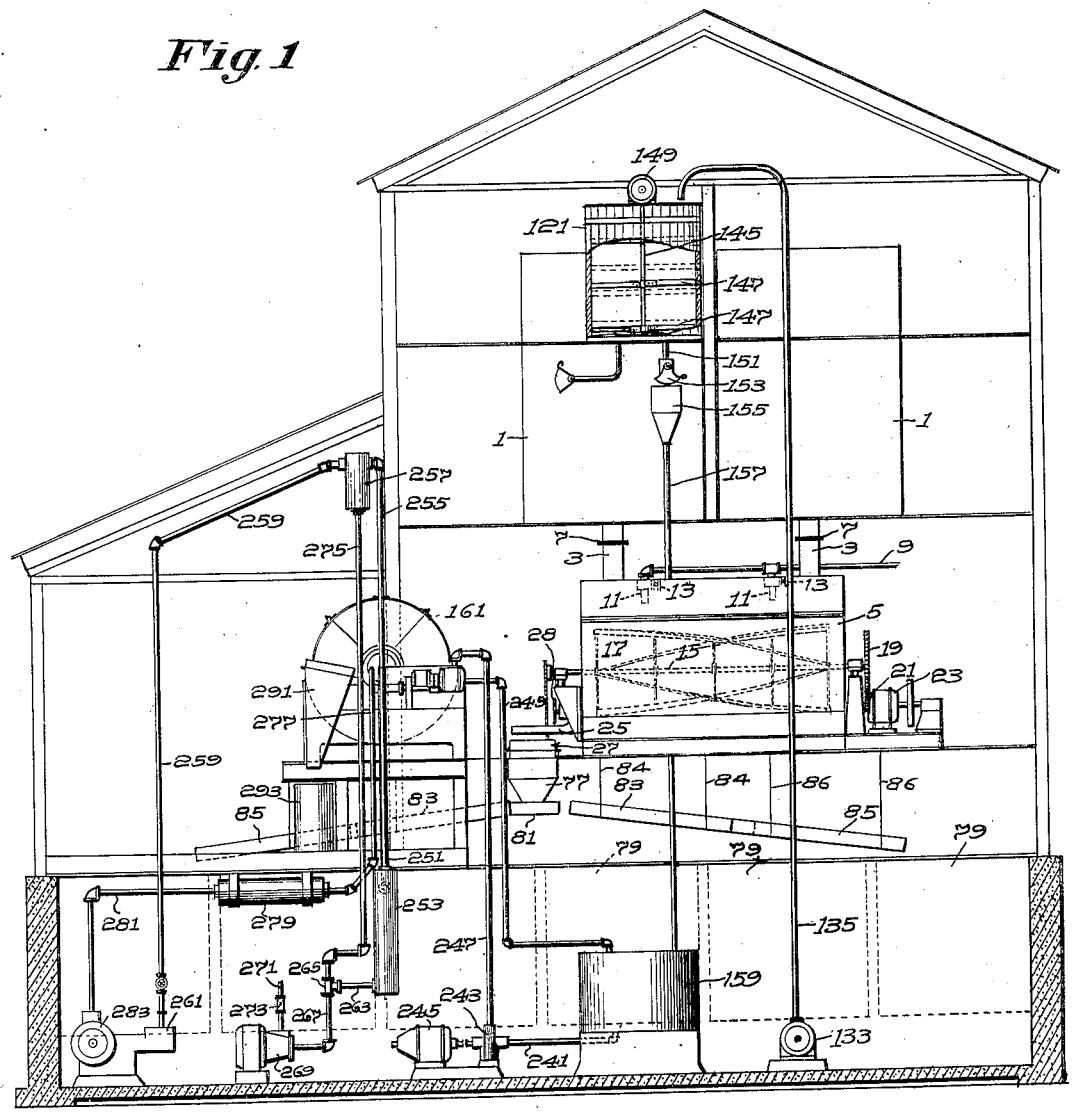
Fig. 1 is an elevation of the apparatus.

Fig. 5 on an enlarged scale is a perspective view of the filter;

Fig. 6 is a sectional detail showing a portion of the filter shaft and the valve housing and plug valve at one end thereof;

Fig. 7 is a transverse section taken on line 7—7 of Fig. 6;

Fig. 8 is a side elevation of one of the filter disks showing the bag for one of the sectors removed;

Fig. 9 is a perspective view of the filter tank;

Fig. 10 is an end view of the valve cap;

Fig. 11 on an enlarged scale is a section through one of the filter sectors, showing layers of lime putty cake accumulated thereon;

Fig. 12 is a side elevation of the screen and a portion of the chute leading thereto;

Fig. 13 is an end view of the construction shown in Fig. 12, looking toward the left of said figure; and Fig. 14 is an end view of the construction shown in Fig. 12, looking toward the right of said figure.

Referring to the drawings, the apparatus shown therein as one good form of means by which the process may be practiced, comprises two bins 1 (Fig. 1) for receiving the lime, said bins being provided with pipes 3 for delivering the lime to the slaker vat 5. The pipes 3 may be provided with gates 7 for controlling the discharge of lime from the bins to the slaker vat. Water may be conducted to the slaker vat through a pipe 9 provided with branch pipes 11 having valves 13.

To mix the lime and water introduced into the slaking vat, the latter may be provided with a shaft 15 having stirrer blades 17 thereon. The shaft may be rotated by reduction gears 19 and 21 driven by an electric motor 23.

The slaked lime is fed by the stirrer blades 17 toward the left end of the vat 5, and is delivered through the open side 24 of a trough 25 to a screen 27 (Figs. 1, 2, 12, 13 and 14), the delivery being controlled by a valve 28. This screen comprises a box 29 having at opposite sides thereof brackets 31 provided with flanges 33 resting on rollers 35 in grooves in brackets 36 supported on rails 37.

Mounted in the box is fine wire mesh screen clothing 39 which may have sixteen or more meshes to the inch. This fine clothing rests upon and receives support from coarse screen clothing 41 which may have two meshes to the inch.

The brackets referred to, are so placed on the box as to support the screen with a slight inclination.

To shake the screen, a bumping device may be provided comprising a cam 43 having projections 45 on the periphery thereof adapted for engagement with a member 47 at the upper end of the box. The cam may be mounted on a shaft 49 journalled in bearings 51 mounted on a support 53. The shaft may be provided with a sprocket wheel 55 connected by a sprocket chain 57 with a sprocket wheel 59 on the slaker shaft 15 referred to.

To press the member 47 against the periphery of the cam, a coil spring 63 may be provided at the lower end of the box, said spring being confined between a channel 65 on the box and a collar 67 on a rod 69, one end being entered through a hole in the channel, and its opposite end entered through a hole in a transverse member 71 connecting the box supporting rails referred to. The collar is held by an adjusting nut 73 and a locking nut 75 threaded on the rod. The adjusting nut is adapted to engage the transverse member. The construction is such that the coil spring will react against the collar and press the box along the rails and cause its member 47 to be held in engagement with the cam. As the cam rotates, its projections will intermittently engage said member and impart a bumping motion to the screen, thereby enabling nearly all of the slaked lime to pass through the meshes of the fine screen. Any large particles and foreign matter which may accumulate in the box on top of the screen clothing may be shovelled therefrom from time to time.

The material passing through the screen gravitates into an inclined chute 77 (Figs. 1 and 4), and passes thence into any one of several aging vats 79, in the present instance, six of such vats being provided. To direct the material to the different vats, a short trough 81 (Fig. 1) may be provided to deliver the material to either of the two central vats, trough sections 83 may be provided on hangers 84 to direct the material to the vats adjacent to the two central vats, and trough sections 85 may be provided on hangers 86 to direct the material to the two outermost vats.

The construction is such that while the material is being delivered to one of the vats, the material may be aging in other vats, the material may be whipped or agitated by means to be described in other vats, and the aged material may be delivered from still another vat through means to be described.

As stated, after the lime putty has aged sufficiently in a vat, water may be added to the aged lime putty to render the same in fluid condition. The water may be introduced to the vats through a main pipe 87 having branch pipes 89 located at the different vats and provided with valves 93.

After the water is added, it is desirable to whip, beat or agitate the lime solution to aerate and give the same uniform consistency throughout, and assist in rendering the same in condition such that it may readily flow from the vat. To accomplish this, in the present instance, the upper edges of the longer walls of the vats may be provided with rails 95 (Fig. 2) on which may be placed a carriage 97 (Figs. 2 and 4) provided with an upright support 99 on which is a carrier 101 in which are journalled a pair of vertical shafts 103 provided at their lower ends with propellers or blades 105, said shafts being adapted to be rotated by an electric motor 107 and a suitable transmission mounted on the carrier.

The carrier may be raised or lowered to move the propellers toward or away from the bottom of the vat by vertical screws 109 carried by the support and threaded to the carrier, said screws being rotated by a suitable transmission manually actuated by an endless chain 111 passing over a pulley 112.

To propel the carriage along the rails on the vat, there is provided on the carriage an electric motor 113 which drives a sprocket wheel 115 connected by a sprocket chain 117 with a sprocket wheel 119 on one of the wheel shafts of the carriage.

Since this apparatus for whipping or agitating the materials in the vat is the subject of Letters Patent of the United States No. 1,485,205, granted February 26, 1924, it is unnecessary to show and describe the same in detail herein.

After the propellers have been lowered into the vat, the carriage may be propelled along the vat, and the elevation of the propellers may be varied, so that all of the lime solution in the vat is thoroughly whipped, agitated, aerated and rendered in fluid condition, so that it may readily flow from the vat.

The lime solution may be delivered from any one of the vats to a lime solution tank 121 (Fig. 1) which preferably is located at a level a substantial distance above the vats. To accomplish this, in the present instance, each of the aging vats may have a pipe 123 leading from the bottom and also leading to a central point where there is a pipe union or valve body 125 provided with a valve 127. Leading from the valve body is a pipe 129 connected to a rotary pump 131 of usual construction driven by an electric motor 133. The pump in turn is connected to the lower end of a vertical pipe 135 which extends upward to and has a delivery end at the top of the lime solution tank 121.

The construction is such that the valve 127 may be adjusted selectively to deliver the lime solution from any one of the aging vats to the pipe 129. The lime solution may be forced by the pump 131 up through a vertical pipe 135 to the lime solution tank 121.

The entrance of each of the pipes 123 may be provided with a plug valve 137 (Fig. 4) having a stem 139 extending upward through a walk-way 141, the upper end of said stem being provided with a handle 143. The construction is such that the operator standing on the walk-way may open or close the plug valve of any one of the vats.

The piping and valve arrangement for controlling delivery of the lime solution from the several vats, is the subject of a copending application, Serial No. 623,070, filed March 5, 1923, and therefore, it is unnecessary to show and describe the same in detail herein.

To agitate the lime solution in the tank 121 and prevent settling of the lime, a suitable agitator may be provided conveniently in the form of a vertical shaft 145 provided with blades 147, said shaft being rotated by an electric motor and bevel gear mechanism 149 mounted on the top of the lime solution tank.

Projecting from the bottom of the lime solution tank is a pipe 151 having a valve 153 at the lower end thereof. Directly beneath said valve is a funnel 155 connected to a vertical pipe 157 which extends downward to the main storage tank 159 for the lime solution.

The lime solution is passed from the main storage tank 159 to the means for filtering the lime solution, thereby to remove excess moisture from the lime solution and produce a putty having proper condition for use. In the present instance of the invention, this filter which will now be described with more particular reference to Figs. 5, 6, 7, 8, 10 and 11, is of the vacuum disk type, and comprises a series of disks 161, each formed of sectors 163. Each sector comprises a fan-shaped core 165 of wood deeply corrugated on both sides and having thereon a cloth bag 167. This bag has a small sleeve 169 wrapped about a drainage nipple 171 on the core.

The disks are mounted on a large, hollow center shaft 173 having outstanding nipples 175 for connection with the drainage cap nipples of the sectors. The hollow shaft is provided with channels 177, each communicating with the nipples of the disk sectors which are in longitudinal alinement.

At one end of the shaft is a valve housing 179 having channels 181 communicating with the shaft channels, the outer ends of the channels in the valve housing being closed by plugs 183. The valve housing channels are provided with inner ports 185 registering the ports 187 in a bushing 189.

Mounted in the bushing is a conical valve plug 191 formed to provide a compartment 193 for receiving the filtrate, a passage 197 for receiving low pressure air, and an air exhaust passage 198. This compartment and these passages are adapted for communication with the bushing ports 187 and the channels 181, as more fully hereinafter described.

To the outer end of the valve is secured a cap 199 (Fig. 10) containing an outlet 201 for the filtrate, an inlet 203 for the low pressure air, and an outlet 205 for the exhaust air.

The valve is held in leak-tight engagement with the bushing by a rod 207 entered through the valve and a thrust plate 209. Encircling the rod is a coil spring 211 confined between washers 213 and 215. The washer 213 bears against the thrust plate and the washer 215 is limited by a nut 217. On the outer end of the rod are an adjusting nut 219 bearing against the valve cap and a lock nut 221. The construction is such that the spring will draw the conical valve into close fitting relation with the bushing.

The shaft and disks carried thereby are adapted to rotate slowly. To accomplish this, a worm gear 223 is provided on the valve housing and meshes with a worm 225 connected by a coupling 227 with a reduction gear transmission in a case 229 driven in turn by a reduction gear transmission in a case 230, the latter transmission being driven by an electric motor 231.

When the shaft, the disks thereon, and the valve housing are rotated, the channels for the rows of sectors are progressively brought into communication with the filtrate compartment, the compressed air passage, and the air exhaust passage.

The disks are adapted to rotate in a tank 233 for receiving the lime solution. The tank has at one side thereof compartments 235 formed to receive the several disks, and these compartments are formed to leave spaces 237 between them through which the filtered lime putty may be discharged, as more fully hereinafter described.

At the upper edges of the compartments are pairs of scrapers 239 mounted at opposite sides of the disks, and adapted to remove the lime paste therefrom, as more fully hereinafter described.

To conduct the lime solution from the storage tank 159 to the filter tank, a pipe 241 (Fig. 1) may be connected to the bottom of the storage tank and to a pump 243 driven by an electric motor 245. A pipe 247 projects from the pump to the filter tank. To maintain the solution at a predetermined level in the filter tank, a pipe 249 is provided having one end connected to the tank adjacent the upper edge thereof, and having its lower end communicating with the upper end of the storage tank 159.

The construction is such that when the lime solution rises to the level of the point of connection of the pipe 249 with the filter tank, the overflow will flow down through said pipe back into the storage tank, and thus the solution is maintained at a constant level in the filter tank.

The vacuum means for drawing the filtrate away from the disks, comprises a pipe 251 connected to the filtrate outlet 201 in the cap, said pipe extending downward to a filtrate receiver 253. Rising from the upper end of this receiver, is a vertical pipe 255 connected to the upper end of a moisture trap 257 which is located well above the filter. Also connected to the moisture trap is a pipe 259 which extends down to a vacuum pump 261. To remove filtrate from the receiver 253, a pipe 263 has one end connected to the receiver, and its other end connected to a union 265. A pipe 267 leads from this union to a centrifugal pump 269 provided with a discharge pipe 271 having a check valve 273 therein. A vertical pipe 275 is connected to the bottom of the trap 257 and extends downward to and is connected to the union 265. The construction is such that the pump 269 may serve both to remove filtrate from the receiver 253 and moisture from the trap 257. The vacuum pump 261 will establish suction effect in the disks through the pipe 259, trap 257, pipe 255, receiver 253, and the pipe 251.

The means for establishing the low pressure in the disks to facilitate removal of the filtrate cake from the outer surfaces thereof comprises a pipe 277 connected to the low pressure inlet 203 in the cap 199, and leading downward from the filter to an air receiver 279 connected by a pipe 281 with an air compressor or blower 283. The construction is such that the low pressure may be established in the disks by the pump through the pipe 281, the air receiver 279, and the pipe 277. The pressure in the sectors may be released through the air exhaust passage 198 and the outlet 205.

To adjust the conical valve plug 191 referred to, a rod 287 may be connected to the valve cap 199 adjacent one edge thereof, the lower end of said rod being connected to an adjusting device 289. This rod will also serve to hold the valve plug in its different positions of adjustment.

The lime putty or cake removed from the disks, may pass down between the filter tank compartments 235 referred to, and fall into a hopper 291 adapted to deliver the putty into containers such as the container 293 which may desirably have a capacity of one cubic foot, a size which can be readily handled. Or if desired, the putty may be delivered from the hopper to a conveyer or other means for carrying the putty to the point desired.

In operation, as the filter is rotated at a slow speed in a contra-clockwise direction (Fig. 5), the disk sectors will successively pass through the filter tank. With the vacuum established in the filtrate receiving compartment 193 of the valve plug, as a sector submerges in the lime solution in the tank, the filtrate channel 177 in the shaft with which the disk sector communicates, and the valve housing channel 181 forming a continuation of the shaft channel, will be brought in communication with the filtrate receiving compartment 193 in the valve plug. This will establish the vacuum in the submerged sector. As the sector passes slowly through the solution in the tank, a cake or layer of the putty will accumulate thereon, and the excess moisture will be drawn into the sector and carried into the filtrate receiver.

Then the sector with the cake thereon will emerge from the solution and slowly move toward the scrapers 239. In the course of this movement the sector will continue to be subject to the vacuum effect, thereby to draw excess water from the cake. The amount of water removed may be controlled by regulation of the speed of rotation of the disks.

In due course the sector will move to a position in which the shaft and valve housing channels for the sector are in communication with the low pressure passage 197 in the valve plug. This will inflate the filter sector with air at a low pressure, and cause the filter bag to bulge outward slightly, so that when the sector moves downward between the scrapers 239, the plastic putty cake is removed from the fabric surfaces of the bag, and drops down between the tank compartments through the hopper 291 into the container 293.

After the sector has passed the scrapers, the shaft and valve housing channels for the sector will come into communication with the air exhaust passage 198 in the valve plug, thereby allowing escape of the low pressure air from the sector.

Thereupon the cycle of operations described is repeated.

Since sectors will continuously pass through the filter tank while other sectors are continuously passing the scrapers, the excess water in the lime solution will be continuously removed therefrom, and the putty cake will be continuously discharged from the filter. When the putty is discharged from the filter, it has the desired amount of moisture removed therefrom to render the same in condition for use as finish coat putty.

Operation of the filter may be regulated with a desirable nicety of control, so that the desired amount of moisture may be removed from the lime solution. For example, good results may be obtained by filtering to reduce the moisture from 68 per cent in the lime solution to 50 per cent in the lime putty or cake. Then the putty will have sufficient cohesion to enable the same to be placed in hods or open cans without flowing therefrom.

The lime solution is aged and treated in batches in the aging vats, but fluid aged lime putty will always be ready for delivery from one or another of the vats so that material may be supplied continuously for filtration.

By this process and apparatus a finish coat lime putty will be produced which is superior to that made by former processes. Not only is a product of improved quality obtained, but it is manufactured in shorter time than has been possible by former processes, due to the fact that nearly all of the slaked lime is passed through a screen of fine mesh, thereby materially shortening the time required for slaking, and due to the fact that it is unnecessary for the lime to stand in the vats to allow excess water to evaporate therefrom to produce lime putty of proper consistency.

It will be understood that the invention is not limited to the specific process disclosed herein, and that various deviations may be made therefrom without departing from the spirit and scope of the appended claims.

What is claimed is:

1. A process of making finish coat lime putty consisting in mixing lime and water to slake the lime, fine screening the lime solution to eliminate larger slow slaking particles and foreign particles, aging the screened slaked lime solution, introducing the aged slaked lime solution to a filter, and forcing part of the water therefrom through the filter to leave a plastic finish coat putty or base suitable for mixing with water and plaster of Paris or fine sand to form finish coat material.

2. A process of making finish coat lime putty consisting in mixing lime and water to slake the lime, delivering batches of the slaked lime solution to vats, allowing the batches to age progressively in the vats, continuously feeding the aged solution from one or another of the vats to a filter, and forcing part of the water therefrom through the filter to leave a plastic finish coat putty or base suitable for mixing with water and plaster of Paris or fine sand to form finish coat material.

3. A process of making finish coat lime putty consisting in mixing lime and water to slake the lime, allowing the slaked lime to stand for a period to age the same, adding water to the aged slaked lime to thin the same, and forcing part of the water from the solution through a filter to leave a plastic finish coat putty or base suitable for mixing with water and plaster of Paris or fine sand to form finish coat material.

4. A process of making finish coat lime putty consisting in mixing lime and water to slake the lime, allowing the slaked lime to stand for a period to age the same, adding water to the aged slaked lime to thin the same, whipping or stirring the thinned aged slaked lime thoroughly to mix the same, and then forcing part of the water from the solution through a filter to leave a plastic finish coat putty or base suitable for mixing with water and plaster of Paris or fine sand to form finish coat material.

5. That improvement in the process of making finish coat lime putty consisting in mixing lime and water to slake the lime, feeding the slaked lime to a filter, and continuously driving part of the water from the slaked lime through the filter to leave a plastic finish coat putty suitable for mixing with water and plaster of Paris or fine sand to form finish coat material.

6. A process of making finish coat lime putty characterized by mixing lime and water to slake the lime, aging the slaked lime, feeding the aged slaked lime solution to a filter, and establishing a vacuum effect in the filter to draw part of the water from the solution and leave a plastic finish coat putty.

7. A process of making finish coat lime putty characterized by mixing the lime and water to slake the lime, fine screening the slaked lime solution, aging the slaked lime solution in batches, adding water to the aged slaked lime batches to thin the same, whipping or agitating the thinned aged slaked lime batches to render the same in fluid condition, and progressively delivering the batches to a filter, thereby continuously to remove part of the water from the aged slaked lime solution to leave a plastic finish coat putty or base suitable for mixing with water and plaster of Paris or fine sand to form finish coat material.

8. A process of making finish coat lime putty consisting in mixing lime and water to slake the lime, aging the slaked lime solution, continuously feeding the aged solution to a filter, and forcing part of the water from the solution through the filter to leave a plastic finish coat putty or base suitable for mixing with water and plaster of Paris or fine sand to form finish coat material.

9. That improvement in the process of making finish coat lime putty consisting in mixing lime and water to slake the lime, feeding the slaked lime to a filter, continuously forcing part of the water from the slaked lime through the filter, thereby continuously to form plastic finish coat putty, and continuously removing the plastic finish coat putty from the filter.

WILLIAM T. DOYLE.